(12) United States Patent
Campbell et al.

(10) Patent No.: US 11,270,342 B2
(45) Date of Patent: Mar. 8, 2022

(54) SYSTEMS AND METHODS FOR DEDUCING USER INFORMATION FROM INPUT DEVICE BEHAVIOR

(71) Applicant: Rovi Guides, Inc., San Jose, CA (US)

(72) Inventors: Ray Campbell, Redwood Shores, CA (US); Walter R. Klappert, North Hollywood, CA (US); Paul George Milazzo, Hockessin, DE (US)

(73) Assignee: Rovi Guides, Inc., San Jose, CA (US)

( * ) Notice: Subject to any disclaimer, the term of this patent is extended or adjusted under 35 U.S.C. 154(b) by 142 days.

(21) Appl. No.: 16/017,478

(22) Filed: Jun. 25, 2018

(65) Prior Publication Data

US 2019/0026776 A1  Jan. 24, 2019

Related U.S. Application Data

(63) Continuation of application No. 13/096,415, filed on Apr. 28, 2011, now abandoned.

(51) Int. Cl.
*G06Q 30/00* (2012.01)
*G06Q 30/02* (2012.01)

(52) U.S. Cl.
CPC .............................. *G06Q 30/0255* (2013.01)

(58) Field of Classification Search
None
See application file for complete search history.

(56) References Cited

U.S. PATENT DOCUMENTS

| | | | |
|---|---|---|---|
| 5,764,241 A | 6/1998 | Elliott | |
| 5,878,222 A | 3/1999 | Harrison | |
| 6,642,939 B1 | 11/2003 | Vallone et al. | |
| 7,543,322 B1 | 6/2009 | Bhogal et al. | |
| 8,225,348 B2 | 7/2012 | Morris et al. | |
| 8,528,019 B1 | 9/2013 | Dimitrova et al. | |
| 2002/0042913 A1* | 4/2002 | Ellis | H04N 7/163 725/34 |
| 2002/0120925 A1 | 8/2002 | Logan | |

(Continued)

FOREIGN PATENT DOCUMENTS

| | | | | | |
|---|---|---|---|---|---|
| JP | 2008097472 A | * | 4/2008 | ............. | G06Q 50/00 |
| JP | 2010198493 A | * | 9/2010 | ............. | G06Q 30/00 |
| JP | 2010198595 A | * | 9/2010 | ............... | G06N 5/02 |

OTHER PUBLICATIONS

• Haoqiang Zheng. RSIO: Automatic User Interaction Detection and Scheduling. (2010). Retrieved online Apr. 22, 2021. https://www.cs.columbia.edu/~nieh/pubs/sigmetrics2010_rsio.pdf (Year: 2010).*

(Continued)

*Primary Examiner* — James A Reagan
(74) *Attorney, Agent, or Firm* — Haley Guiliano LLP

(57) ABSTRACT

User selections entered in the media application or any user input device behavior with user devices may be recorded as clickstream data. The clickstream data may be used to deduce information about the user or a media item being consumed. A user may be profiled based on his or her input device behavior using a plurality of time-stamped indicators. A degree of user interest may be determined based on a time period between the time-stamped indicators, the number of time-stamped indicators within a period of time, and/or a type of user action.

16 Claims, 10 Drawing Sheets

(56) References Cited

U.S. PATENT DOCUMENTS

| | | | |
|---|---|---|---|
| 2002/0129368 A1* | 9/2002 | Schlack | G06Q 30/02 725/46 |
| 2002/0173971 A1 | 11/2002 | Stirpe et al. | |
| 2003/0018080 A1 | 1/2003 | Gulman et al. | |
| 2003/0018980 A1* | 1/2003 | Gorbatov | H04N 5/782 725/133 |
| 2003/0093790 A1* | 5/2003 | Logan | G10H 1/0033 725/38 |
| 2003/0182310 A1* | 9/2003 | Charnock | G06Q 10/10 |
| 2003/0204367 A1* | 10/2003 | Hartigan | G06Q 10/10 702/178 |
| 2004/0045020 A1 | 3/2004 | Witt et al. | |
| 2005/0015615 A1* | 1/2005 | Gonsalves | H04L 63/1408 726/26 |
| 2005/0071865 A1* | 3/2005 | Martins | H04N 21/25435 725/10 |
| 2005/0154591 A1* | 7/2005 | Lecoeuche | G10L 15/30 704/270.1 |
| 2006/0064037 A1* | 3/2006 | Shalon | G16H 20/60 600/586 |
| 2007/0092204 A1* | 4/2007 | Wagner | H04N 21/4147 386/241 |
| 2007/0136773 A1 | 6/2007 | O'Neil et al. | |
| 2007/0156029 A1* | 7/2007 | Morris | A61B 5/16 600/300 |
| 2008/0059390 A1 | 3/2008 | Cox et al. | |
| 2009/0112617 A1 | 4/2009 | Jung et al. | |
| 2009/0144154 A1 | 6/2009 | Schein | |
| 2009/0259518 A1 | 10/2009 | Harvey et al. | |
| 2010/0070345 A1 | 3/2010 | Abelow | |
| 2010/0076274 A1 | 3/2010 | Severson | |
| 2010/0162286 A1 | 6/2010 | Berry | |
| 2010/0182631 A1 | 7/2010 | King et al. | |
| 2010/0205541 A1 | 8/2010 | Rapaport et al. | |
| 2010/0287049 A1 | 11/2010 | Rousso et al. | |
| 2010/0299292 A1* | 11/2010 | Collazo | G06F 21/577 706/14 |
| 2010/0332329 A1 | 12/2010 | Roberts et al. | |
| 2011/0078572 A1* | 3/2011 | Milazzo | G06F 11/34 715/733 |
| 2011/0179385 A1* | 7/2011 | Li | G06F 16/7867 715/810 |
| 2011/0258032 A1* | 10/2011 | Vadlamani | G06F 16/335 705/14.42 |
| 2011/0258049 A1* | 10/2011 | Ramer | G06Q 30/02 705/14.66 |
| 2011/0289427 A1* | 11/2011 | Toprani | H04N 5/782 725/133 |
| 2012/0066618 A1* | 3/2012 | Barker | H04L 12/1813 715/753 |
| 2012/0149342 A1 | 6/2012 | Cohen et al. | |
| 2012/0151308 A1 | 6/2012 | Falkenberg et al. | |

OTHER PUBLICATIONS

U.S. Appl. No. 13/096,415, filed Apr. 28, 2011, Ray Campbell.
U.S. Appl. No. 13/096,425, filed Apr. 28, 2011, Ray Campbell.
U.S. Appl. No. 13/096,430, filed Apr. 28, 2011, Ray Campbell.

\* cited by examiner

| User id | Time-Stamp | Event |
|---|---|---|
| ⋮ | ⋮ | ⋮ |
| 064675133 | 11:18:43.7 | Fast Forward |
| 064675133 | 11:18:44.2 | Fast Forward |
| 064675133 | 11:18:44.9 | Fast Forward |
| 064675133 | 11:19:02.9 | Play |
| 064675133 | 12:05:59.3 | Volume Up |
| 064675133 | 12:06:00.6 | Volume Up |
| 064675133 | 12:06:00.9 | Volume Up |
| ⋮ | ⋮ | ⋮ |

| User id | Time-Stamp | Event |
|---|---|---|
| ⋮ | ⋮ | ⋮ |
| 468441684 | 23:04:11.9 | Fast Forward |
| 468441684 | 23:04:13.5 | Fast Forward |
| 468441684 | 23:44:05.7 | Rewind |
| 468441684 | 23:44:07.3 | Play |
| 468441684 | 23:44:15.5 | Pause |
| ⋮ | ⋮ | ⋮ |

| User id | Time-Stamp | Event |
| --- | --- | --- |
| ⋮ | ⋮ | ⋮ |
| 064675133 | 14:18:43.7 | Fast Forward |
| 064675133 | 14:18:44.2 | Fast Forward |
| 064675133 | 14:18:47.5 | Fast Forward |
| 064675133 | 14:19:02.9 | Play |
| 064675133 | 15:05:59.3 | Volume Up |
| 064675133 | 15:06:00.6 | Volume Up |
| 064675133 | 15:06:00.9 | Volume Up |
| ⋮ | ⋮ | ⋮ |

1006 = rows with Fast Forward/Play events
1008 = rows with Volume Up events

1004

| User id | Time-Stamp | Event |
| --- | --- | --- |
| ⋮ | ⋮ | ⋮ |
| 354384343 | 14:18:44.7 | Fast Forward |
| 354384343 | 14:18:45.2 | Fast Forward |
| 354384343 | 14:18:48.5 | Play |
| 354384343 | 14:19:00.2 | Rewind |
| 354384343 | 14:19:01.1 | Play |
| ⋮ | ⋮ | ⋮ |
| 354384343 | 14:23:05.6 | Channel Up |
| 354384343 | 14:23:08.9 | Channel Up |
| 354384343 | 14:23:12.2 | Channel Up |
| 354384343 | 14:23:15.2 | Channel Down |
| 354384343 | 14:23:16.1 | Channel Down |
| 354384343 | 14:23:17.4 | Channel Down |
| 354384343 | 15:06:01.3 | Volume Up |
| 354384343 | 15:06:04.1 | Volume Up |
| ⋮ | ⋮ | ⋮ |

1010 = Fast Forward/Play/Rewind rows
1012 = Channel Up/Down rows
1014 = Volume Up rows

FIG. 10

SYSTEMS AND METHODS FOR DEDUCING USER INFORMATION FROM INPUT DEVICE BEHAVIOR

CROSS-REFERENCE TO RELATED APPLICATIONS

This application is a continuation application of U.S. patent application Ser. No. 13/096,415, filed Apr. 28, 2011, now pending. The contents of which are hereby incorporated by reference herein in its entirety.

BACKGROUND OF THE INVENTION

This invention relates generally to interactive media guidance applications, and more particularly, to systems and methods for deducing user information from input device behavior.

Users can generally consume media via a variety of media devices. During the consumption of media or interaction with media devices, user behavior may be tracked by one or more applications or components that can capture and communicate clickstream information. A clickstream may be a recording or a log of user selections or activity on a media device such as during the consumption of a media item or during the interaction with a media application. Analysis of clickstream data points may be performed to assess media use, including: user media preferences, media usage trends and patterns, audience measurements and/or characteristics, usage of certain features with a media device or applications running on the media device. The analysis of clickstream data remains an area of study.

Marketing professionals have clamored for clickstream data since the 1990s. However, various problems continue to exist related to clickstream data. For example, there is a lack of quality specifications that define exactly which clicks to capture from a remote controller, mouse, or other input device. It's often not clear what context information a user is viewing or clicking about when clickstream data is being gathered. There are concerns with user privacy related to gathered information. There are also technical challenges caused by limited bandwidth which has hobbled clickstream deployment and analysis.

Many systems focus on raw clickstream data points to predict information about a user. However, raw stream data is limited in the types of information provided. Some systems use a single clickstream data point to make an inference about a user. However, such anecdotal data can be noisy because the user may have pressed a button by mistake. In addition, single data points may not be as informative as data observed or aggregated over time. Accordingly, there is a need for a system that does not rely on raw data points, but rather, examines other types or forms of clickstream data.

To make inferences, clickstream data generally relies on media content that has been labeled, i.e., content that has been identified as belonging to a certain category or having a certain attribute. The labeling provides information related to the content of the media item, or portions thereof, such that an inference can be made about the user based on the labeling of the media content. However, labeled content is expensive and time consuming to create and maintain because human editors are typically required to physically view the content to categorize (i.e., label) it. Accordingly, there is a need for a system that can label media content without requiring human intervention.

Additionally, media content is generally categorized into genres or other categories based on manual input from human editors. For example, a content provider may hire an editor to identify and categorize content based on, for example, genre. Alternatively, a marketing group study may be conducted to identify the kinds of users for which a media program is most suited. These methods are costly and time consuming. Accordingly, there is a need for a system that can create such categorical data for media content without a formal marketing study or human editor to create the data.

SUMMARY OF THE INVENTION

The present application discloses systems and methods that address deficiencies in the prior art by determining user and/or media content characteristics based on clickstream data gathered from one or more media devices that are associated with one or more media users.

There are many types of user devices that may be used to consume and/or interact with media items. Examples of such devices may include audiovisual devices, handheld portable devices, computers, televisions, personal communication devices, and other devices capable of presenting or supplying media. Media (e.g., a media item) may include music, television programming, movies, games, news, internet based media content, videos, recordings, and other types of media. Media devices may include a media application which may be used to identify, display, and/or access media items or content. For example, an interactive media application may be used with a set-top box, television, monitor or other display device for identifying and accessing television programs, interactive games, movies, music, or other types of media. In another example, a media application may provide a user interface for identifying and selecting media items or media content from media providers and suppliers for consumption via a handheld device, computer, telephone, set-top box, television or other suitable device.

According to one aspect of the disclosure, a clickstream application may be partially or entirely implemented on a user device or a remote server for gathering clickstream data. The clickstream application may be software and/or hardware, and configured to gather and/or analyze clickstream data.

The clickstream application may record user selections entered via the media application or any user input device behavior with user devices as clickstream data. Such clickstream data may be stored on the device, or at a remote location, and analyzed on a real time basis (e.g., within about 5 seconds or less), or at a later time, to determine media trends and media device usage.

According to one aspect of the disclosure, the clickstream application may profile a user based on his/her input device behavior. The clickstream application may receive a plurality of time-stamped indicators based on user actions over a period of time with a media device while interacting with a media item. Each of the time-stamped indicators may be associated with a type of user action with the media device. The clickstream application may measure one or more time periods between the time-stamped indicators and the number of time-stamped indicators within the period of time. Based on at least one time period between the time-stamped indicators, the number of time-stamped indicators within the period of time, and at least one type of user action, the clickstream application may determine a degree of user interest in a portion of the media item.

According to another aspect of the disclosure, the clickstream application may identify portions of a media item based at least on a user's interaction and/or behavior with an input device. For example, certain user activity may be identified as being related to an event, such as extraordinary or salient moment in a television program or other media item. The clickstream application may receive a plurality of time-stamped indicators based on user actions over a period of time with a media device while interacting with a media item. Each of the time-stamped indicators may be associated with a type of user action with the media device.

The clickstream application may define a plurality of behavior patterns based on time-stamped indicators. Each behavior pattern may be associated with a set of user actions. As the user interacts with the media item, the clickstream application identifies an event associated with the media item by detecting a behavior pattern or change in behavior pattern. In some features, the clickstream application identifies an event associated with a media item by detecting one of the defined behavior patterns as the user interacts with the media item.

According to yet another aspect of the invention, a clickstream application may generate information about a media item. For example, users may be grouped based on their respective clickstream activity during the consumption of one or more media items. Based on the user grouping, the clickstream application may derive information about a media item of content being consumed by a user of the group, such as genre information, or parental ratings, and the like. The clickstream application may receive time-stamped indicators during the consumption of a media item from a plurality of users. Each of the time-stamped indicators may be associated with a type of user action with a user media device. Based at least in part on the received time-stamped indicators from each user media devices, the clickstream application may classify users into a plurality of groups. The clickstream application may also derive information about the media item based in part on a first characteristic shared among at least two of the users belonging to a first group of users.

The methods and systems described herein may be applied to any type of media device in which an application, interface, or component is provided for accessing media content, and which is capable of capturing clickstream information alone or in combination with other related devices.

A clickstream includes one or more of various types of data based on user interactions or actions with a media device such as, without limitation: a keyboard stroke, mouse click, joystick command, keypad depression, voice command, touchscreen touch, haptic interaction, gesture input, remote control key initiation, device movement, user movement, user expression, fast-forward command, rewind command, pause, stop, play, volume up, volume down, set-top box control command, and the like.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 9 shows two example clickstream logs from two different users;

FIG. 10 shows another two example clickstream logs from two users;

DETAILED DESCRIPTION OF EMBODIMENTS

Figure 1:
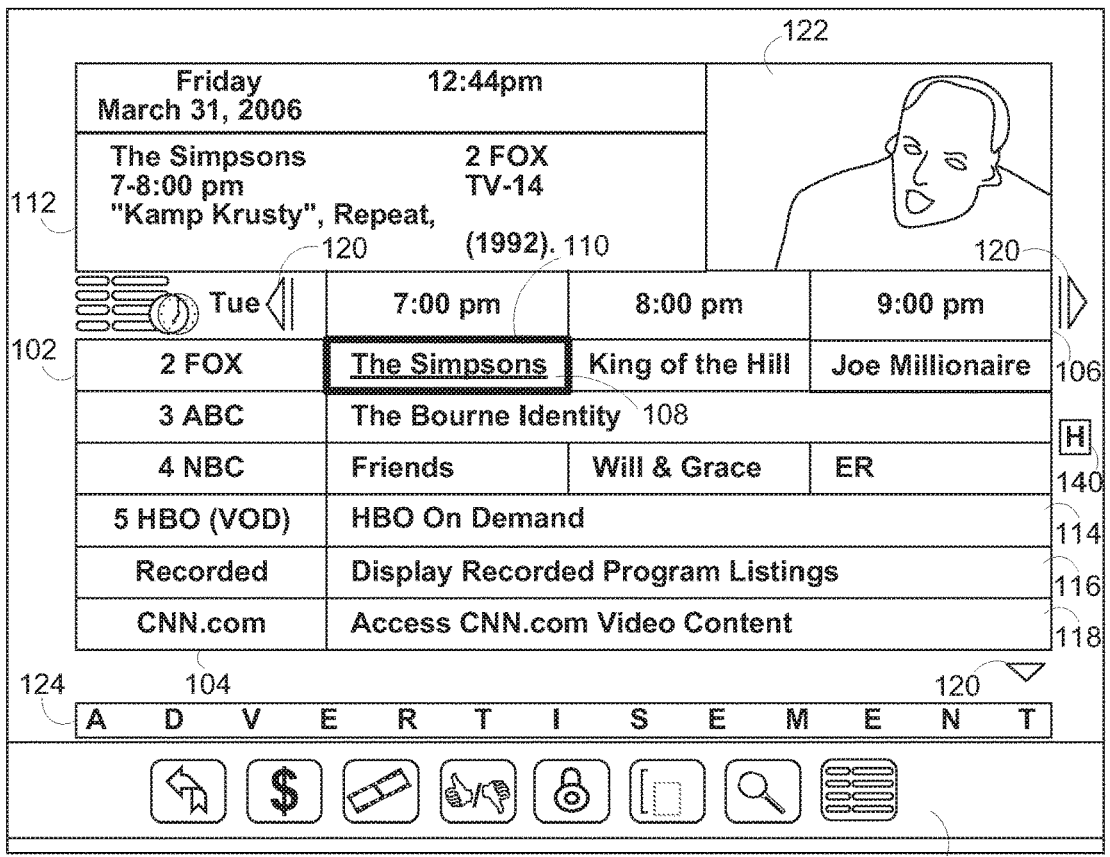
FIG. 1 shows a display screen using a grid format that may be used to provide guidance for various types of media.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a website), or as stand-alone applications or clients on hand-held computers, PDAs, mobile telephones, or other mobile devices. The various devices and platforms that may implement media guidance applications are described in more detail below.

Figure 2:
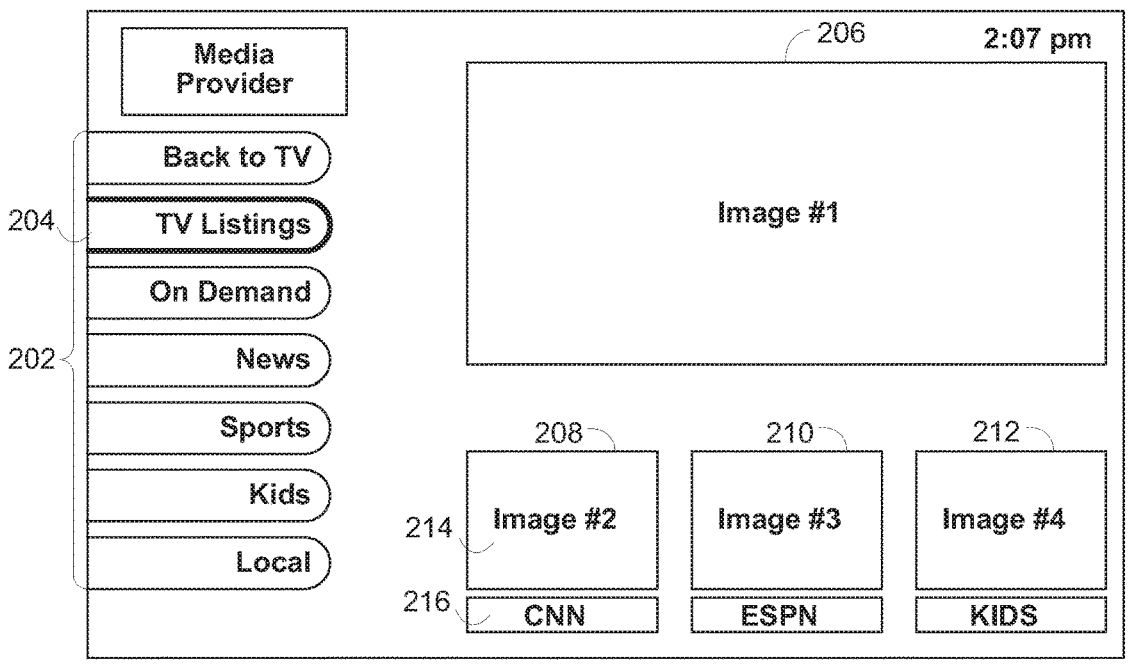
FIG. 2 shows a display screen using a mosaic that may be used to provide guidance for various types of media.

One of the functions of the media guidance application is to provide media listings and media information to users. FIGS. 1-2 show illustrative display screens that may be used to provide media guidance, and in particular media listings. The display screens shown in FIGS. 1-2 may be implemented on any suitable device or platform. While the displays of FIGS. 1-2 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and The Sopranos and Curb Your Enthusiasm are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
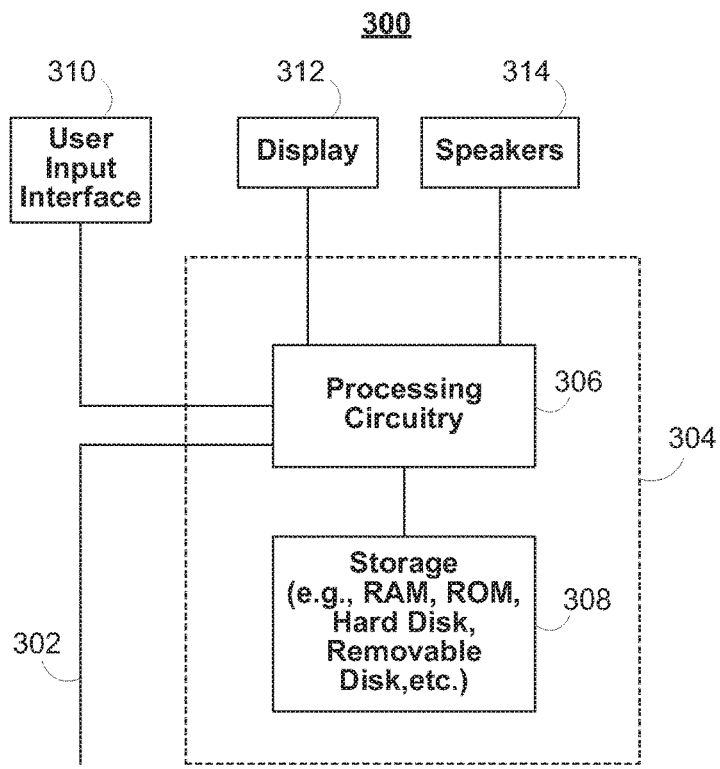
FIG. 3 shows a user equipment device according to an illustrative aspect of the application.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
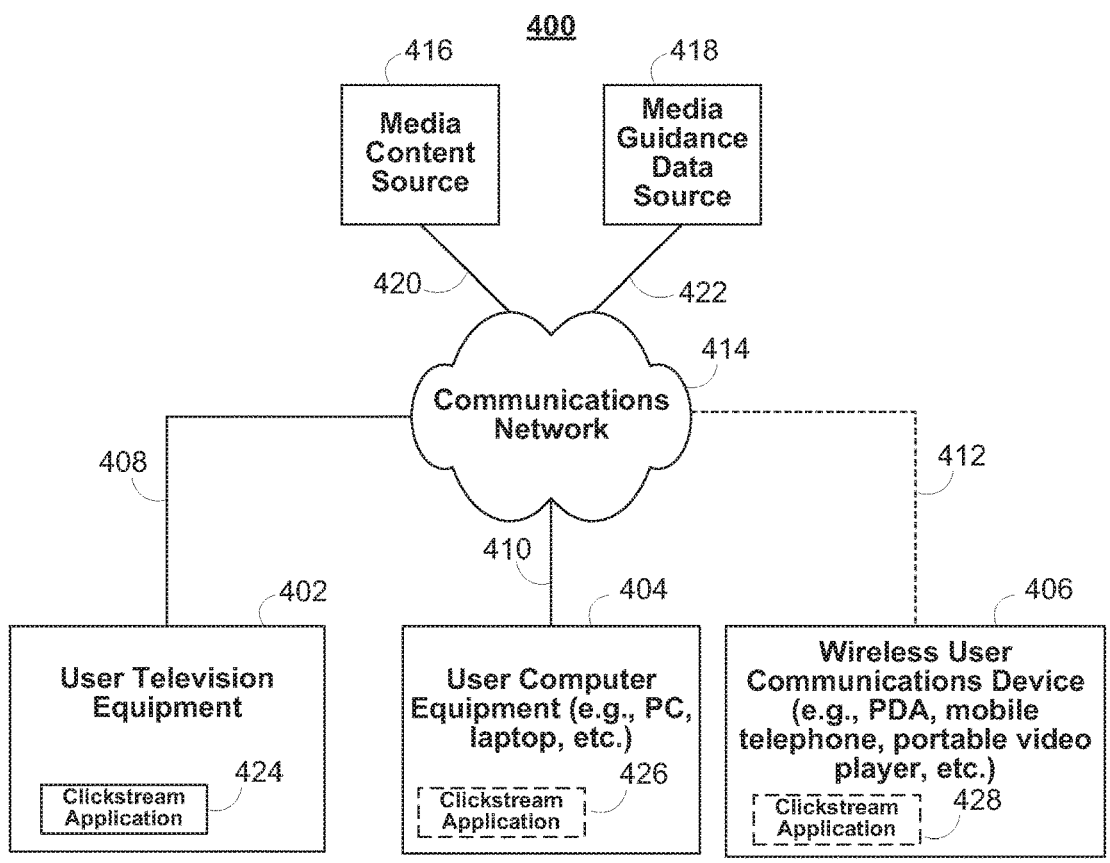
FIG. 4 shows a simplified diagram of an illustrative interactive media system.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a stand-alone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PCs, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, standalone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

In some embodiments, user television equipment 402 includes a clickstream application or function 424. User computer equipment 404 and/or wireless user communications device 406 may also include a clickstream application 426 and/or 428, respectively. Clickstream application 426 and/or 428 may be part of clickstream application 424, or may be standalone clickstream applications. The following will refer to clickstream application 424. However, it will be understood that the same discussion may apply to clickstream applications 426 and/or 428. In some embodiments, clickstream application 424 may include software and/or hardware components, partially or entirely implemented on user television equipment 402, user computer equipment 404, wireless user communications device 406, media guidance data source 418, and/or any suitable server(s). Clickstream application may monitor user actions with the user television equipment 402, user computer equipment 404, or wireless user communications device 406. In addition, clickstream application 424 may include analysis functions to analyze collected user actions.

It will be appreciated that while the discussion of media content or media items has focused on video content, the systems and methods described herein can be applied to other types of media content, such as music, images, podcasts, and the like. Other examples of media items may include media programs, such as movie, television program, video, song, audio program, game, broadcast program, and multimedia program.

As described above, users may interact with the system via user input interface 310 in various ways, such as making a selection, or invoking a command, etc. A clickstream application may capture any user interaction with a media device (e.g., user equipment device 300, user television equipment 402, user computer equipment 404, and wireless user communications device 406) as clickstream data. Clickstream data may include time-stamped indicators, where the time-stamped indicators may be associated with at least a user identifier and a type of user action with a media device.

Figure 5:
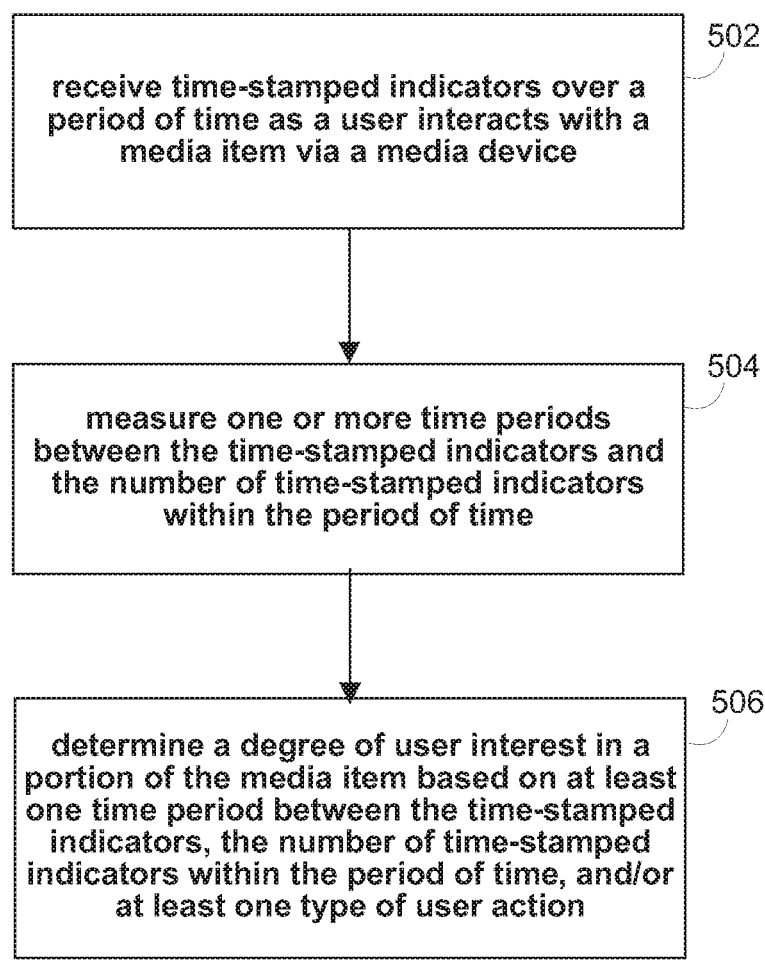
FIG. 5 shows a flow diagram of a method for deducing user information from user behavior.
Figure 6:
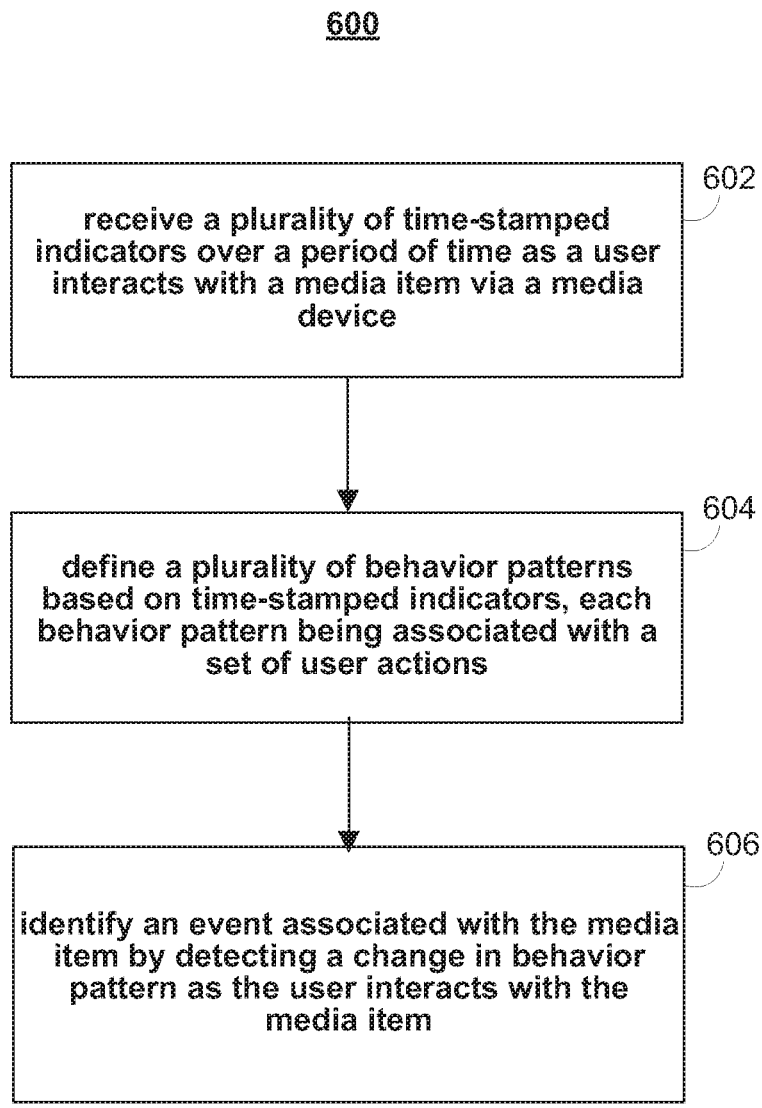
FIG. 6 shows a flow diagram of a method for identifying a portion of a media item.
Figure 7:
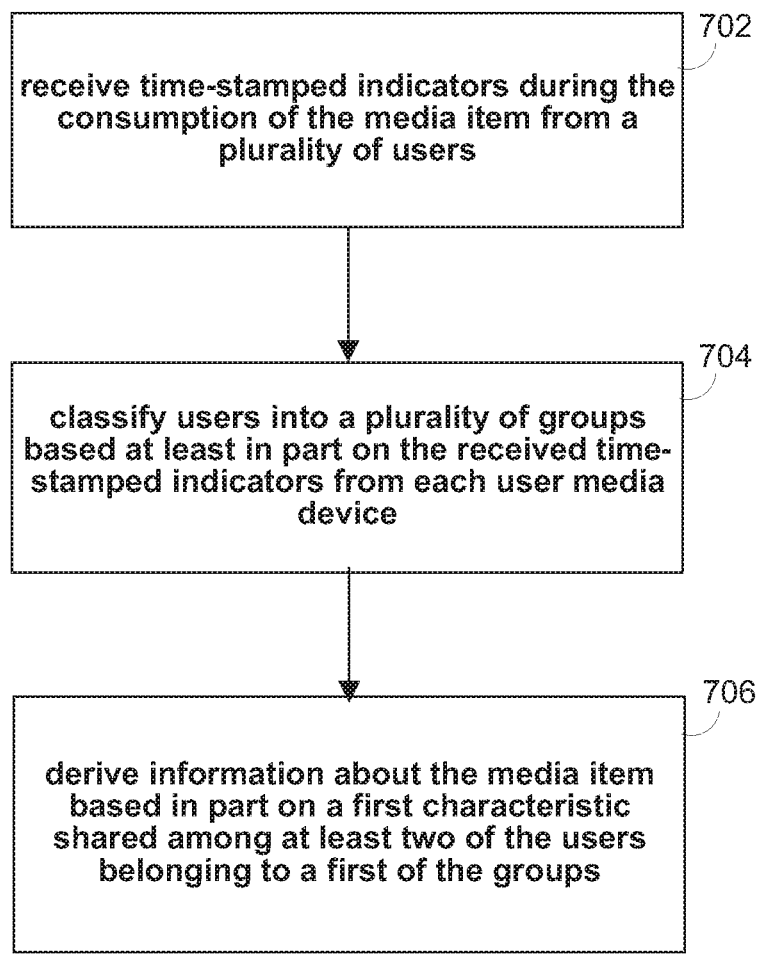
FIG. 7 shows a flow diagram of a method for generating information about a media item.

The following flow diagrams of FIGS. 5-7 illustrate various exemplary processes involved in some aspects of the present disclosure. Where appropriate, these processes may, for example, be implemented completely or partially in the processing circuitry of a user equipment device (e.g., processing circuitry 306, user television equipment 402, user computer equipment 404 or wireless user communications device 406), or in a processing server located remotely from the user equipment device (e.g., media guidance data source 418). Illustrative examples of how the processes or variations of the processes may be practiced are discussed in further detail in relation to FIGS. 8-12.

Depending on how a user is using an input device, while consuming a media item or interacting with a media application, information about the user or groups of users (or the media item, if appropriate) may be deduced from the input device behavior as recorded in the clickstream. For example, user behavior with an input device may be indicative of a user's personality. In another example, the user behavior with an input device during the consumption of a media item may be indicative of the degree or level of user interest in a portion of a media item.

FIG. 5 shows a flow diagram of an exemplary method for deducing user information from user behavior. In some aspects, clickstream data may be used to gauge a user's degree or level of interest in a portion of a media item. For instance, the speed of a user's presses on the volume button may be indicative of the degree or level of interest in the portion of a media item being consumed at the time (i.e., the faster the speed, the higher the interest). In one illustrative example, process 500 may be used to deduce information about a user's interest in a particular portion of a media item.

First, clickstream application 424 receives a plurality of time-stamped indicators based on user actions over a period of time with a media device while interacting with a media item (e.g., user equipment device 300, user television equipment 402, user computer equipment 404, and/or wireless user communications device 406) (step 502). For example, user computer equipment 404, e.g. a personal computer, may include clickstream application 424 that gathers and/or analyzes clickstream data captured from a user's interaction with user computer equipment 404 and/or the like. In some instances, each of the time-stamped indicators are associated with a type of user action with the media device. For example, a user may press the "Ch+" (channel up) button on a remote control during the consumption of a video. A signal may be sent from the remote control to a desktop computer. The desktop computer may track user actions such as this "Ch+" button press by storing a log of user activities and/or actions (e.g., the "Ch+" button press may be logged as a time-stamped indicator associated with "Channel Up"). Similarly, the set-top box may forward the button press action information to a remote server, such as media guidance data source 418, for further processing and storage. While examples discussed herein are generally related to remote control button presses, one of ordinary skill in the art will understand that other kinds of user actions with other media and input devices (such as user input interface 310) may be received and/or stored as time-stamped indicators.

User actions recorded as time-stamped indicators may include at least one of a keyboard stroke, mouse click, joystick command, keypad depression, voice command, touchscreen touch, haptic interaction, gesture input, remote control key initiation, fast-forward command, rewind command, pause, stop, play, volume up, volume down, and set-top box control command, and the like.

Depending on the system configuration and design, clickstream application 424 may receive time-stamped indicators in real-time, periodically, continuously or at other time intervals. In some aspects, clickstream application 424 may receive time-stamped indicators at pre-scheduled time periods. For instance, time-stamped indicators may be received only during time periods of high activity (e.g., prime-time period for television broadcasting). In another instance, clickstream application 424 may receive time-stamped indicators from users/devices that have been opted in to having user actions tracked and monitored by the system. Any suitable configuration for receiving or storing time-stamped indicators may be used to optimize for system objectives such as protecting user privacy, improving system load and efficiency, and/or lowering errors in subsequent analyses. Analyses may include reports relating to, for example, viewer behavior, advertising impressions, audience measurements, feature usage and popularity, effectiveness of display structures, and other reports.

Log entries of user actions may include a list or array of time-stamped indicators, where each of the time-stamped indicators may include at least one of: a time-stamp, a user identifier, a user action identifier, or any other suitable data fields useful for describing and analyzing time-stamped user actions. Systems and methods for clickstream capture and analysis are described in detail in Milazzo, U.S. patent application Ser. No. 12/570,778, filed Sep. 30, 2009, which is incorporated by reference herein in its entirety. Time-stamped indicators may be stored in a relational database, or in any suitable data structure that provides easy access to clickstream data, either locally at a user device or remotely at a remote server. Examples of time-stamped indicators are discussed in further detail with respect to FIGS. 9 and 10 later herein.

In certain configurations, clickstream data and/or time-stamped indicators may originate from a plurality of media devices. Collecting clickstream behavior from multiple devices may create a more unified picture of a user's behavior and actions. For example, a user may interact similarly with a cell phone as with a keyboard. Clickstream application 424 may analyze clickstream behavior from both devices or a plurality of devices together for purposes of deducing information from the user behavior with a higher confidence.

The clickstream application 424 may monitor and analyze time-stamped indicators over a period of time as a user interacts with a media item, and/or monitor time-stamped indicators as a user interacts with a media application on a media device. For instance, the application 424 may gather time-stamped indicators based on a user's interactions with a mobile phone, e.g., dialing, because these interactions may be relevant to determining the user's behavior while interacting with a media item.

A media item may include a media program. A media program may include at least one of a movie, television program, video, song, audio program, game, broadcast program, and multimedia program. The media item may also include advertisements that promote products, services, person, company, or any other entity. Examples of advertisements include an image promotion, an interactive banner display on a webpage, an audio announcement, a video clip, product placement within a media program, an icon displayed within a media program, and the like.

Once time-stamped indicators have been received, clickstream application 424 can process the time-stamped indicators (i.e., raw clickstream data) for further analysis. The application 424 may derive data representative of the raw clickstream data. In one configuration, clickstream application 424 analyzes the clickstream data and examines the time between time-stamped indicators. In certain aspects, clickstream application 424 examines the number of time-stamped indicators that occur within a period of time.

Clickstream application 424 may measure one or more time periods between the time-stamped indicators and the number of time-stamped indicators within a period of time (step 504). Clickstream application 424 may calculate time period measurements by subtraction (or any suitable method) using processing circuitry, such as processing circuitry 306 or processing circuitry in a remote server or other media devices. Calculated measurements may be stored in a database or any suitable storage.

The application 424 may include a predictive function that implements a predictive model to identify events, characteristics, and/or features of a media item based on user behavior and/or clickstream data. The application 424 may use a predictive model to identify characteristics of a user or group of users based on clickstream data associated with their interactions with one or more media items. The predictive model and/or algorithm may utilize statistics (e.g., a statistical model) and/or heuristics. In one configuration, certain patterns of time-stamped indicators can be correlated with certain types of users or groups of users. Patterns and their respective correlations with certain user types may be defined manually, statistically, or based on any suitable statistical, predictive, and/or artificial intelligence method. Based on the one or more of these methods, user information may be deduced from detected time-stamped indicators. Example methods include Bayesian inference, logical inference, Markov chain models, and the like.

Various hypotheses and/or predictions may be made about user behavior by the application 424. For instance, users with different personality types may exhibit different clickstream patterns. Besides a user's degree of interest in a particular media item, other characteristics (e.g., a user's personality, language preferences, and physical attributes) may be deduced from the observed time-stamped indicators or clickstream behaviors. For example, inferences may be made about physical attributes, such as determining whether a user may be hearing impaired, visually impaired, vocally impaired, mobility impaired, movement impaired, and/or cognitively impaired. In one configuration, long time periods between time-stamped indicators may indicate that a user is mobility impaired due to a lower than average clicking speed.

Such activity may also or alternatively indicate a casual or uninterested demeanor. In another embodiment, excessive use of the "volume up" control or high volume settings may indicate that a user is hearing impaired. Based on how closely an observed pattern matches an expected or known pattern, a physical characteristic of the user may be deduced from the clickstream. For instance, a long time period on average between time-stamped indicators may indicate that a user is older with a slower than average reaction time. In certain implementations, an exact match to a defined pattern is not required. Rather, the application 424 uses a substantially close match to a defined and/or expected pattern to identify or infer user and/or media item characteristics.

The system may identify user and/or media item characteristics based on observed behavior from a plurality of users. Clustering techniques may be used to group users into various groups and information may be deduced using such classification. For example, clustering techniques may create groups of users statistically based on a pre-defined distance function, where users who generally behave similarly may be grouped together into one group. Based on a set of time-stamped indicators and observed behavior, the application 424 may classify a user into one of the groups. The application 424 may deduce information about a user based at least in part on group membership.

Clickstream application 424 may determine a degree of user interest in a portion of the media item based on at least one time period between the time-stamped indicators, the number of time-stamped indicators within the period of time, and/or at least one type of user action (step 506). As discussed above, in one illustrative configuration, a user who pressed the volume up button four times at a relatively fast pace while watching a news segment in a television program may indicate a stronger interest in the news segment than a user who pressed the volume up button twice at a relatively slow pace (i.e., indicating a lower level of interest). Any number of clickstream patterns may be used to determine interest level or other kinds of user information.

In some aspects, clickstream application 424 may use other sources to gather and/or deduce user information besides clickstream data and time-stamped indicators. For example, user profile information may be leveraged to make a better inference and/or prediction on user information. User profile information may include user preferences, favorites, dislikes, likes, customizations, geographical location, biographical information, or other deduced information about the user. User profile information may or may not include information deduced from clickstream data. In some configurations, the application 424 uses time-stamped indicators to predict user and/or media item characteristics. For instance, a user who subscribes to the Home Shopping Network and frequently changes volume settings during commercials and/or advertisements may be identified as a prospective customer and/or target for advertising promotions online and/or via a media provider.

User profile information may be stored in a database locally on a user's media device or on a processing server (e.g., media guidance data source 418) remote from the user. User profile information may be retrieved from user profiles via sources such as social media websites, online gaming profiles, third-party marketing databases, user-provided profiles on media applications, and/or any other sources that store and gather user information.

In some configurations, information deduced about a user may be used to determine the type of content associated with a portion of a media item. The application 424 may make the determination based on detected user actions over the period of time. For instance, if clickstream data comprises time-stamped indicators of user disinterest (e.g., rapid television channel surfing, quick successions of Fast Forward button presses), the application 424 may determine that the content of the portion of the media item includes an infomercial, especially if the user's profile indicates a general dislike of infomercials. Other types of content may be associated with certain patterns of user actions, and appropriate information may be inferred therefrom based in part on the observed clickstream.

In some configurations, information about or characteristics of a portion of a media item may be stored as metadata. The information may be deduced from user behavior via monitoring of a clickstream associated with a user. The metadata, such as a description of the content, may be managed in a database such as a registry or repository. Metadata may include an assortment of metatags, such as an identifier of the media item, a description of the media content, tags/properties, a timing identifier, or any suitable data fields proper for storing structured data about a media item or portions of a media item. In certain aspects, the metadata is embedded in a media item. The metadata may be received from a media source, such as media content source 416 or media guidance data source 418. The metadata may be embedded by the application 424 or by a media provider based on information from the application 424.

In some cases, metadata may be associated with a broadcast schedule. If the metadata describes media content in relation to a broadcast schedule (such as television schedule program guide data, where the content is assumed to be consumed at the broadcast time), time-stamped indicators received during the consumption of a time-shifted media item (e.g., stored prior to interacting with the media item over a period of time, or downloaded/buffered on-demand) may be processed to account for the time-shift such that the time-stamped indicators may be correlated with the metadata properly. The time-shifted media item may be recorded, buffered, delayed and/or stored, and the like.

In some configurations, the metadata may be independent from the time of consumption of the media item (e.g., metadata may be embedded in a video program). The time-stamped indicators received during the consumption of time-shifted media items may be correlated with identified portions of the media item (e.g., portions with associated time-independent metadata) without accounting for the time-shift. Systems and methods for deducing information about users during the consumption of time-shifted data described above applies to process 600 and 700 of FIGS. 6 and 7 respectively.

The application 424 may use metadata as part of its prediction process for making an inference. In one configuration, the application 424 uses metadata to change certain probabilities in a statistical prediction process. For instance, if a television program is tagged with genre information, the application 424 adjusts certain probabilities and/or references certain expected clickstream patterns based on the genre metadata where users are expected to, for example, behave differently during a children's show versus a reality television program.

Besides deducing information about a user, the application 424 may use clickstream data for identifying extraordinary or salient moments and events in a media item.

FIG. 6 shows an exemplary flow diagram of a method for identifying a portion of a media item. First, clickstream application 424 may receive a plurality of time-stamped indicators based on user actions over a period of time with a media device while the user interacts with a media item (step 602). Details of step 602 are described with respect to step 502 of FIG. 5. Second, any suitable method may be used to define and/or store a plurality of behavior patterns based on time-stamped indicators (step 604). For example, media guidance data source 418 or any suitable server accessible by clickstream application 424 may store defined behavior patterns. Each behavior pattern may be associated with a set of user actions. In some configurations, the defined behavior patterns are defined in terms of data representative of time-stamped indicators.

Behavior patterns may be defined based on empirical data. For example, a statistician and/or clickstream analyzer may analyze time-stamped indicators from a plurality of users for trends and patterns of user behavior. Behavior patterns may be defined based on prior knowledge about users (e.g., based on prior social studies about human behavior, psychology research, and the like). Behavior patterns may be automatically determined, in real time or off-line, based on predictive and/or statistical algorithms that automatically associate certain clickstream data with known user characteristics and/or characteristics of media items.

User behavior patterns may be defined based on certain patterns of time-stamped indicators. For example, a sequence of button presses may be used as a behavior pattern. Pattern definitions may include the number count of button presses, the speed of the button presses, the button or action performed, the application feature or media item being selected, user characteristics associated with the pattern.

Clickstream application 424 may identify an event associated with a media item by detecting a change in behavior pattern as a user interacts with the media item (step 606). For instance, it may be assumed that users may be in different activity and/or interest states depending on the observed behavior. A user exhibiting slow or little activity may be in a disinterested state where the user may not be very excited about the media item. At a certain point during consumption of a media item, a user's activity may change (e.g., a spike in the received time-stamped indicators), indicating that the user is excited about the content. The user has apparently transitioned from a disinterested state to an excited/attentive state. The change in user behavior may indicate the location of an interesting event in a media item, such as, for example, a gossip news segment in an entertainment program. An event associated with the media item may be identified by detecting a type of behavior pattern as the user interacts with the media item.

An event may be a commercial, an advertisement, a scene, a song, an occurrence, an important message, an uninteresting portion, an offensive portion, an extraordinary portion, a beginning of a media program, an end of a media program, a special appearance, a distorted portion, a disturbing portion, and the like. Typically, data about events in a media item or media program is provided by third-party sources at a cost. Using process 600, clickstream application 424 can identify events without the need to pay an editor to manually label events in a media item. Events may be derived automatically using a processor by understanding and monitoring user behavior and associated clickstream patterns. In some instances, the application 424 using process 600 is advantageously more effective at identifying interesting portions of a media item (e.g., a show) because process 600 incorporates the real interests/reactions of the population rather than relying on the potentially subjective judgment of a human editor. The results of process 600 may be more representative of the user population, and likely of more value to interested parties such as content providers and advertisers. In one configuration, rather than running a study group to gauge the interest of individuals to a pilot television program, the application 424 monitors user behavior to identify the level or interest and extraordinary moments in the pilot television program based on process 600.

Metadata may be added that identifies the location of an event in a media item. Metadata may include information about the event. For example, the metadata may label the event as a climax of a movie. Further details regarding metadata and its usage are described herein in relation to FIG. 5.

The detection of changes in user behavior or detection of behavior patterns may be implemented using statistical models. A model of the user may be used to describe user behavior in terms of time-stamped indicators, patterns and their associated probability distributions. According to one aspect, individuals are observed over time (e.g., by receiving time-stamped indicators over a period of time), and a longitudinal model may be used, such as a Markov chain. According to another aspect, users are observed in the aggregate, and a statistical model of the population may be used, e.g., a Bayesian model.

In certain aspects, the identification of an event associated with the media item comprises detecting an aggregate change in behavior pattern related to a plurality of users as they interact with a media item. A threshold may be set based on the number of users where the observed change in behavior pattern occurs for the identification of an event. For example, an event may be identified if a total of 50 people exhibited similar changes in behavior patterns during the consumption of the same media item (e.g., an audio podcast). Users may be aggregated and/or grouped based on age, sex, geography, or any suitable factors.

Besides identifying events in a media item, the application 424 may derive other information about a media item using collaborative and/or similar filtering or predictive methods. For instance, if a plurality of people have interacted with a portion of a media item in a similar fashion, the application 424 may deduce information about the portion of the media item based on characteristics of the plurality of users. More specifically, if a plurality of users exhibited behavior indicating a high level of interest in a portion of a video clip, information (e.g., genre or type of targeted audience) about the video clip may be deduced. For example, if the users are fans of Britney Spears, the application 424 may infer that the video clip was associated with Britney Spears. A more detailed example is discussed later in relation to FIG. 12.

FIG. 7 shows a flow diagram of a method for generating information about a media item. Clickstream application 424 may receive time-stamped indicators during the consumption of a media item from a plurality of users (step 702). Systems and methods for receiving time-stamped indicators from users are described in detail in relation to step 502 of FIG. 5.

Clickstream application 424 may classify users into a plurality of groups based at least in part on the received time-stamped indicators from each user media device (step 704). Classification methods such as supervised learning and statistical classification may be used to model a population of users. Classification may include the process of filtering for information or patterns using techniques involving time-stamped indicators received from a plurality of users. The application 424 may use clustering and/or classification techniques to deduce information about users in the aggregate, and/or to deduce information about media items being consumed.

Classification may include determining classes of users among a population. If desired, unsupervised learning may be used to determine how the time-stamped indicators are organized without a set of pre-defined classifications. To determine the classes among a population, the application 424 may use a clustering method to assign a set of observations (e.g., user behaviors, user profiles, time-stamped indicators) into subsets or clusters. The clustering method may include the definition of a distance function that describes how similar at least two users are based at least in part on their user profile or time-stamped indicators. Based on the subsets/clusters, different classes and/or groups of users may be defined. Unsupervised learning may be performed offline or online. Any suitable or similar learning methods, such as neural networks, may be used for determining the classes and/or groups of users among a population.

In some configurations, the application 424 uses supervised learning and/or reinforcement learning. A known set of classes, definitions, and/or associated data (e.g., pairs of time-stamped indicator with desired classification) may be provided as training data to the classification system. As such, the time-stamped indicators of a user who has not been classified may be provided as inputs to the classification system. The application 424, using the system, may predict/learn the classification of a user. Any other suitable supervised learning methods may be used to classify users among a population, such as, without limitation, support vector machines.

Results from the classification may be useful for deducing information about the media item being consumed. Users who behave a certain way during the consumption of a media item may provide insight about the media item itself. According to one aspect, shared interests of users who behaved similarly during the consumption of a media item may provide information about the genre of the media item. For example, users that are classified as having an interest in antiques may show excitement during a segment of the Today Show in the form of certain detected clickstream behavior. This may indicate that the segment/portion of the Today Show is related to antiques.

The clickstream application 424 may derive information about a media item based in part on a first characteristic shared among at least two of the users belonging to a first group of users (step 706). For example, some or all users within a class/group may share an interest in golf. This shared interest, along with the detection of similar behavior among the group of users, may be indicative of the content in the portion of the media item (e.g., the content was about a golf tournament, or golf players like this content). In another example, some or all of the users within the class/group may share a disinterest in certain content, e.g., dogs. The application 424 may deduce, based on detected disinterested behavior among a group, that a portion of a media item was associated with dogs. The application 424 may store the deduced/derived information about the media item as metadata.

Metadata associated with a media item may affect the classification process. For instance, the type of media item (which may be indicated in a metatag) may affect the learning methods in the classification process. In one configuration, the application 424 uses different classification methods depending on the type of media item. For example, the application 424 may use a supervised learning method for audio media items while using an unsupervised learning method for video media items. In another configuration, the application 424 makes predictions and/or inferences based on the characteristics of the media item. A characteristic of a media item may be described by embedded and/or associated metadata. For example, users with a shared interest in fish may be interpreted differently for a show on the Food Network versus a show on the Outdoor Channel. For the show on the Food Network, observations of a group of users with a shared interest in fish may indicate that the media item is related to cooking fish. As for the show on the Outdoor Channel, the observations may indicate that the media item is related to the sport of fishing instead.

The application 424 may associate shared characteristics with user profiles of users in a group (e.g., stored as user metadata). Characteristics associated with user profiles may include preferences, customizations, favorites, properties derived from time-stamped indicators, and the like. For example, lists of favorite musicians in a user profile may be used as characteristics of a user. Users in a first group may share the same liking in a particular musical artist.

Information about a media item may be derived from more than one of the groups and/or classes identified by the classifying process. The application 424 may derive information about a media item based in part on a second characteristic shared among users belonging to a second group of users. For example, users of the second group may share an interest in fly fishing which can be a shared characteristic. Thus, the application 424 may detect behavior of the first group to determine that a media item is related to the sport of fishing, while the detected behavior of the second group enables the application 424 to determine that the media item is related to fly fishing.

Information about users and a media item derived from the time-stamped indicators may be advantageous in a recommendation system. The application 424 may make a recommendation about a media item to a user of the first group based at least in part on a first characteristic. For example, if a shared characteristic of the first group is golf, the application 424 may recommend other golf related media items to users in the first group. Media item recommendations may also include products and services recommendations in commerce, and/or products and services shown in a media item.

According to another aspect, the application 424 may make a media item recommendation to a user of the second group based at least in part on the first characteristic. For example, a media item related to golf (i.e., the first characteristic) may be recommended to users of the second group (e.g., the group of users who like fly fishing). In some cases both groups of users may have shown interest in the same media item, as indicated by their time-stamped indicators. This recommendation may be based on a prediction that users in the first group may agree on certain interests with users in the second group (e.g., people who like fishing may also like golf or vice versa, if they both liked a particular television program).

Collaborative filtering may enable a recommendation engine of the application 424 to cross recommend media items based on user and/or group characteristics. The recommendation may be made based in part on the shared characteristic. The recommendation may be made based in part on an individual's user profile and/or group affiliation. The application 424 may make a media item to a first user of a first group based at least in part on a user profile of a second user in the first group. For instance, if a first user within a first group likes and/or is associated with poker, a poker tournament gaming website may be recommended to a second user within the first group, who may not have indicated an interest in poker. Likewise, the metatag "poker" may be added to the second user, based on a prediction that users who behave similarly may share common interests.

According to yet another aspect, if the metadata about a portion of a media item (or just the media item) is known, that metadata may be added to a profile associated with users of the first group. For example, if the portion of the media item has a metatag identifying the item as including content about cooking salmon, then a metatag "likes cooking salmon" may be added to at least one profile of the users in the first group.

The following figures and illustrations in FIGS. 8-12 are illustrative examples and applications of the processes 500, 600 and 700 as described in relation to FIGS. 5-7.

Figure 8:
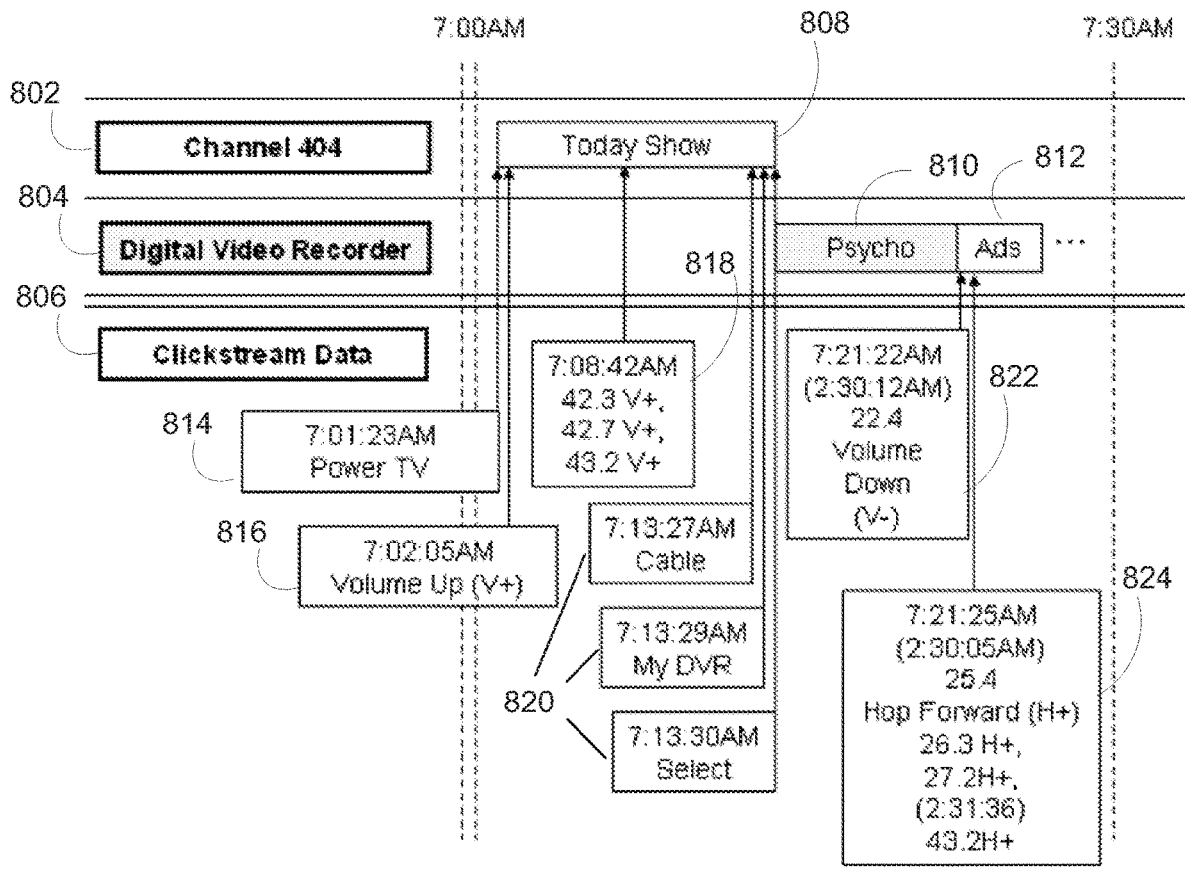
FIG. 8 shows an exemplary clickstream timeline.

Advertisers and marketing professionals are particularly interested in deducing user information from user behavior. FIG. 8 shows an example clickstream timeline associated with a user consuming media items. FIG. 8 shows a timeline of a viewer's and/or user's activity between 7:00 a.m. and 7:30 a.m. in the morning on channel 404 (section 802), digital video recorder (section 804) and clickstream data (section 806). The viewer turned on the television set 23 seconds after 7:01 (box 814) and turned up the volume less than a second after this moment just a tad (box 816). Then the viewer may have watched NBC's "Today Show" (box 808) quietly for about 5 minutes. Then suddenly, there is a burst of several volume-up requests.

Nielsen Ratings, the producers of the "Today Show," and the show's advertisers may be interested in knowing what was happening in the program when the viewer pumped up the volume to hear it better. The observation by the application 424 that the viewer hit the volume-up button repeatedly is important, but how quickly the viewer hits the same button over-and-over-again may be important as well. In illustrative FIG. 8, each volume-up button click (e.g., box 818) was around one second after the previous one. This cadence may indicate a substantial, but not unrestrained, excitement about the subject. For example, the subject may be a news story about Tiger Woods. If the viewer had clicked the volume-up button more frantically or more slowly, the viewer's interest level may be reassessed differently. Details about systems and methods for determining a degree of user interest in a portion of a media item are discussed in relation to FIG. 5.

According to one aspect, the application 424 can make additional predictions about the viewer's personality. Additional or other predictions may include: the viewer's identity and the viewer's interests based on the timings between the viewer's repeated button pushes. For instance, one click per second may suggest that the viewer is interested, but not extremely excited. The application 424 may also be able to determine and/or predict more fundamental aspects of a user's personality such as whether a user has a calm demeanor or is impulsive, along with other personality traits. Details about systems and methods for assessing information about personality or other user characteristics are discussed with respect to FIGS. 5, 9 and 10.

Other patterns of behavior may also provide insight about the viewer and/or the content being viewed. For example, the series of clicks in boxes 820 shows that the viewer has now tuned away from the Today Show. The application 424 may deduce that the user is no longer interested in the Today Show, that the show has adjourned, or that the show has gone to commercial advertisements, or that something uninteresting has started. Details about systems and methods for deducing information about the viewer and the media item are discussed further with respect to FIGS. 6, 7 and 9-12.

Another valuable burst of clicks in FIG. 8 may have occurred around 7:21:25 a.m. (see boxes 822 and 824). At that time, the viewer had switched over to watching the movie "Psycho" (item 810) recorded in the early hours of the same morning on the digital video recorder (DVR). The movie gave way to a commercial break around 7:21:20 a.m. The viewer hit the volume-down button two seconds later (see box 822). Then another burst of clicks happens (see box 824). The viewer hopped forward thirty seconds three times through the commercials but then stopped. The viewer appears to have watched a commercial for about 15 seconds. Advertisement 812 starting at around 2:31:36 a.m. during the recording day on the movie channel playing "Psycho" made an impression on the viewer almost five hours later, a little before 7:22 a.m.

According to one configuration, a service provider may use such information to charge advertisers for ads indicated to have been watched in addition to or rather than charging advertisers for placing advertisements in time slots regardless of whether anyone watches the advertisements. By monitoring the clickstream data for changes in behavior such as, for example, changes in certain click cadence, the application 424 can enable billing of advertisers based on verifiable viewer actions and/or interactions with media items.

In certain configurations, systems and methods for analyzing clickstream data are provided in which clickstream data is gathered by the application 424 that indicates user activity or inactivity on a media device. Activity and/or inactivity may be indicative of whether a user actually consumed certain media items. The clickstream data may include a time-stamp of the user activity and/or the duration of the user activity and/or inactivity. The clickstream application 424 may use a variable threshold associated with user inactivity (or activity) related to a media item. Media item characteristics may be used to determine and/or infer whether the media item (e.g., a television program, radio program, video clip, an advertisement, and the like) was actually viewed and/or consumed by a user. Such a threshold may differ from one media item to another media item, if, for example, the media items have different characteristics. The application 424 may use a variable threshold associated with user inactivity during the time that a media item is being broadcast to determine whether the media item was consumed by a user. For instance, the threshold for inactivity may be different between the morning and the afternoon. User inactivity thresholds may be based on, for example, a quantity and type of user interactivity, elapsed time between user interactions, elapsed time of inactivity, and a schedule associated with the media item. User activity and inactivity thresholds may be variable and based on third party data, group data, and/or user data.

Besides using time between inputs, other input patterns such as the number of interactions, the content selected or recorded, and/or the viewer's choices overall may be tracked. FIG. 8 shows tracking of user activity over a period of half an hour. In some configurations, the application 424 tracks activity continuously and/or over any suitable periods of time. The application 424 may allow users to opt in or opt out of being tracked. Users may configure how and when they should be tracked. For example, a user may choose to only be tracked during commercial breaks, and not while content is consumed. In another configuration, a user may choose to be tracked only on certain days of the week or time of the day. In yet another example, a user may choose to be tracked only when the user is logged on to his/her personal profile.

The application 424 may review various inputs such as clickstream data as seen in FIG. 8, which may be compared and contrasted against any other additional information about the user. The other additional information may include other user profiles or activity data on other platforms. For example, other consumer electronic devices that a user interacts with, such as music players, car electronics, and home appliances, may be other sources of user data.

User behavior at the individual level may be gathered for multiple users such that aggregate/group behavior may be monitored. Systems and methods may be used to analyze how user groups react to certain advertisements, television shows, and/or media items. In another embodiment, input behavior across multiple individuals may be segmented by age, gender, temperament, attentiveness, or any other user characteristic. More information may be gathered about how many and what type of people respond well or poorly to a given media item (e.g., television programs, video clips, advertisements). Feedback may be valuable to advertisers and media providers which sponsor and/or produce the media content. Details about systems and methods that monitor user behavior among a plurality of users are discussed with respect to FIGS. 6, 7, 11 and 12.

Depending on the analysis and inferences desired, the application 424 may record user input device behavior and/or clickstream data differently. Input device behavior, such as clickstream data or log files of device activity, may include structured data sets having information such as timestamps, and/or information about the nature of the input device behavior. Data fields may include a user identifier. The identifier may be used for purposes of tracking individual users. The application 424 may keep certain input device behavior anonymous and/or private so that user privacy may be protected depending on the device and/or user identifier.

Clickstream data may be supplied to a cable system headend, media server, or other component that is configured to receive clickstream data from user equipment 300 or intermediate source for analysis. Clickstream data may be maintained and analyzed locally on user equipment 300. In either arrangement, clickstream data may be processed using control circuitry 306 and stored in storage 308 on a permanent or temporary basis. Clickstream data may include continuous collection of any information relating to user activity. For example, any user input interface entries, such as remote-control key presses, channel changes, navigation and use of media guidance application features, recording information, and/or other activity may be collected as clickstream data. In addition, clickstream data may also include information about a media guidance application and associated elements. Some examples of such clickstream data may include a periodic health indication, available features, application configuration, element information, or other information about the media guidance application.

The clickstream data may be analyzed as collected and sent to a remote server for analysis. In some embodiments, clickstream data may be processed, for example, using processing circuitry 306, to create data structures or short sequences of data which may be referred to as log entries. The clickstream log entries may be stored in storage 308 or sent via a communications path to a remote storage device. The clickstream log entries may also be sent to a headend or remote analysis facility. When clickstream log entries are analyzed at a remote analysis facility, clickstream log entries may be aggregated from multiple users for analysis. The analysis facility may store and process the clickstream logs and log entries and prepare various analytical reports relating to, for example, viewer behavior, advertising impressions, audience measurements, feature usage and popularity, effectiveness of display structures, and other reports.

FIG. 9 shows two example clickstream logs from two different users. Clickstream logs entries may include one or more devices and users. In this illustrative example, clickstream log 902 is associated with one user, and clickstream log 904 is associated with another user. Clickstream logs 902 and 904 (and clickstream logs 1002 and 1004 in FIG. 10) may include data fields such as "User Id," "Time-Stamp" and "Event." "User Id" field allows the tracking of separate users, as long as the "User Id" is unique to each user (e.g., a randomly generated string, an IP address, or a MAC address). In some configurations, the "User Id" is associated with a user profile, such as an on-line account associated with a web-site. In certain configurations, the data in the "User Id" field is associated with a device. In yet some other embodiments, the data in the "User Id" field may change dynamically when the device or system detects that another user is using the device.

The "Time-Stamp" field may include any data suitable for tracking the timing of each log entry in the clickstream. "Time-Stamp" field may include a sequence of characters that denote the date and/or time at which an input device behavior event occurred, a counter, relative time, and the like. Data in "Time-Stamp" may be recorded by a computer and/or the application 424 when the application 424 detects the occurrence of input device behavior and/or a user action. The timestamp may not coincide exactly in time with the time in which the input device behavior, event, and/or activity occurs. Timing data may be logged in a consistent format that enables efficient comparison of two different timestamp entries and tracking of progress over time. The format may be standardized based on, without limitation, ISO 8601.

The "Event" field may include information about the nature of the input device event. In this illustrative example, an identifier of the remote control button press (e.g., "Fast Forward," "Play," "Volume Up," "Rewind" and "Pause") was recorded in the event field. Other input device event information may include: type of device being used, keystroke inputs, features navigated, item selections, codes, abbreviations, or combinations thereof. Examples of such clickstream data may include a periodic health indication, application/device state information, geography, origin/destination information, HTML requests, data transferred/received, data requested/submitted, error messages, available features, application configuration, element information, and/or other information about the media application and/or user device.

Each clickstream log entry or a group of clickstream log entries may be referred to as time-stamped indicators that describes the timing and nature of an input device event. In some configurations, clickstreams are stored as raw input device data. Clickstream data may be filtered, for example, by processing circuitry 406, such that certain less important information or erroneous information may be removed. Filtering may occur at processing circuitry 306, at a remote server, or a remote facility using one or more filtering algorithms. Some examples of clickstream information that may be filtered are periodic health status indications that are normal, a routine pulse message, hardware configurations, and/or other routine messages. Devices may be identified for filtering based on random filter assignments, user relative interactivity, and/or information known about devices, such as location, type, user details, and other bases. Constant or consistent filtering algorithms may be used in some embodiments. In other configurations, filtering algorithms may be provided that change, according to, for example, user interactivity, hardware changes, media changes, and/or other basis.

As an example, clickstream logs 902 and 904 are compared to illustrate how user information may be deduced by the application 424. Sequence 906 of clickstream log 902 shows a record of a user pressing on the "Fast Forward" button three times over a period of about one second, while sequence 910 of clickstream log 904 shows a user pressing on the "Fast Forward" button twice with about 1.5 seconds in between. Sequence 906 may be indicative of a user who wishes to fast forward past content that they dislike as quickly as possible, while sequence 910 may be indicative of a user who does not necessarily dislike the content and is, therefore, fast forwarding past the content at a slower pace.

Other deductions may be made, such as the age and/or age group of the user. The application 424 may have a predictive rule that younger users are quicker at using the fast forward feature because they have a quicker reaction time for knowing when to stop fast forwarding content (e.g., such as trying to skip advertisements during a commercial break and stopping when a user senses that the television program is about to return from commercial break and pressing "Play"). If so, the application 424 may predict that a user exhibiting sequence 906 is more likely to be a younger person than a user with sequence 910 (i.e., someone who may be more savvy with digital video equipment). The arrangement of sequence 910 being followed by sequence 912 (e.g., where the user pressed "Rewind" and "Play") may indicate that the user's reaction time was too slow and had missed the beginning of television program content after a commercial break. Systems and methods for deducing user information are discussed in more detail with respect to FIG. 6.

According to another aspect, clickstream logs 902 and 904 may be valuable for deducing information about the content of a media item being consumed by one or more users. For example, sequence 906 and/or sequence 910 may be indicative of an uninteresting portion of media content (e.g., a commercial break) because the user did not seem to want to consume the content. Instead, the user fast forwarded and skipped it. As such, uninteresting portions of media content and/or a media item may be identified and located using clickstream data.

Similarly, the application 424 may identify and locate salient/interesting portions in a media item. Sequence 908 may be indicative of an exciting moment in the media item being consumed, because a user has pressed "Volume Up" three times within a period of about a second. Behavior as such may indicate unrestrained interest in the portion of the media item (e.g., FIG. 5). Sequence 908 may also be indicative of audio problems with the portion of the media content (e.g., the audio may be distorted, or recorded at a low volume). According to another aspect, sequence 908 may indicate that the user is hearing impaired. Sequence 912 may indicate that a user has found an interesting portion of the media content because a user pressed rewind and paused the media item for a second review (e.g., a referee call during a sports game). Related systems and methods for deducing information about the media content being consumed are discussed in relation to FIGS. 6, 7, 10 and 11. Various information about how the media content may be stored as metadata is discussed in relation to FIG. 5.

Besides monitoring individual behavior, the application 424 may aggregate and examine a plurality of user behaviors for the same media item to analyze a media item being consumed. Aggregating clickstream data from multiple user devices may be valuable in identifying media consumption trends and information about the content of a media item. Examples of valuable information deduced using aggregation of clickstream data over many users may include identifying salient moments/events in the media item, identifying different behavior of the population based on time of day or genre of media being consumed, identifying popular portions of a media item, identifying unpopular portions of a media item, and so on. In some situations, aggregate behavior may be more useful to media producers and advertisers when they make a business decision to provide content to a large number of people (e.g., placing a superbowl advertisement or selecting a timeslot for a television broadcast program).

The application 424 may store aggregate behavior data and distribute such data to producers and/or advertisers to enable them to tailor media content based on user reaction and/or behavior. Aggregation of clickstream data from multiple sources may also be used by the application 424 to better deduce information about the media item. In some instances, clickstream data at the individual level may be noisy, intermittent, and/or inconsistent. The aggregation of clickstream data among multiple users can provide more definitive information about the media item. Aggregation may be performed by the application 424 using raw clickstream data or may occur with information derived from the clickstream data, or a combination of both.

FIG. 10 shows two additional example clickstream logs from two users. When examined together by the application 424, behavior patterns between the user of clickstream log 1002 and the user of clickstream log 1004 may indicate that there are certain extraordinary moments in the media item being consumed. While the clickstreams 1002 and 1004 are from two users consuming the same media item at the same time (e.g., a scheduled television broadcast), similar methods may be applied to clickstream data for a media item that is consumed at different times by different users (e.g., on-demand or time-shifted media items). Systems and methods for relating clickstream data for users consuming the same media item at different times are discussed further in relation to FIG. 5.

Sequences 1006 and 1010, although not exactly the same, may indicate that a portion of the media content is uninteresting because both users skipped the content at about the same relative time in the media item playing sequence. Sequences 1008 and 1014, although not in the exact same fashion, show that the users both increased the volume (three times for clickstream log 1002 and twice for clickstream log 1014). Observing a plurality of users behaving in this manner may indicate that the portion of the media item is a salient event in the media item. At the individual level, sequence 1012 of clickstream 1004 may indicate that the user was uninterested in the content consumed at 14:23. However, when information is aggregated over a plurality of users, the application 424 may determine that the media content is uninteresting to the general population or uninteresting to a subset of the general population. In addition, information from a plurality of sources may serve to validate clickstream information associated with individual users.

Figure 11:
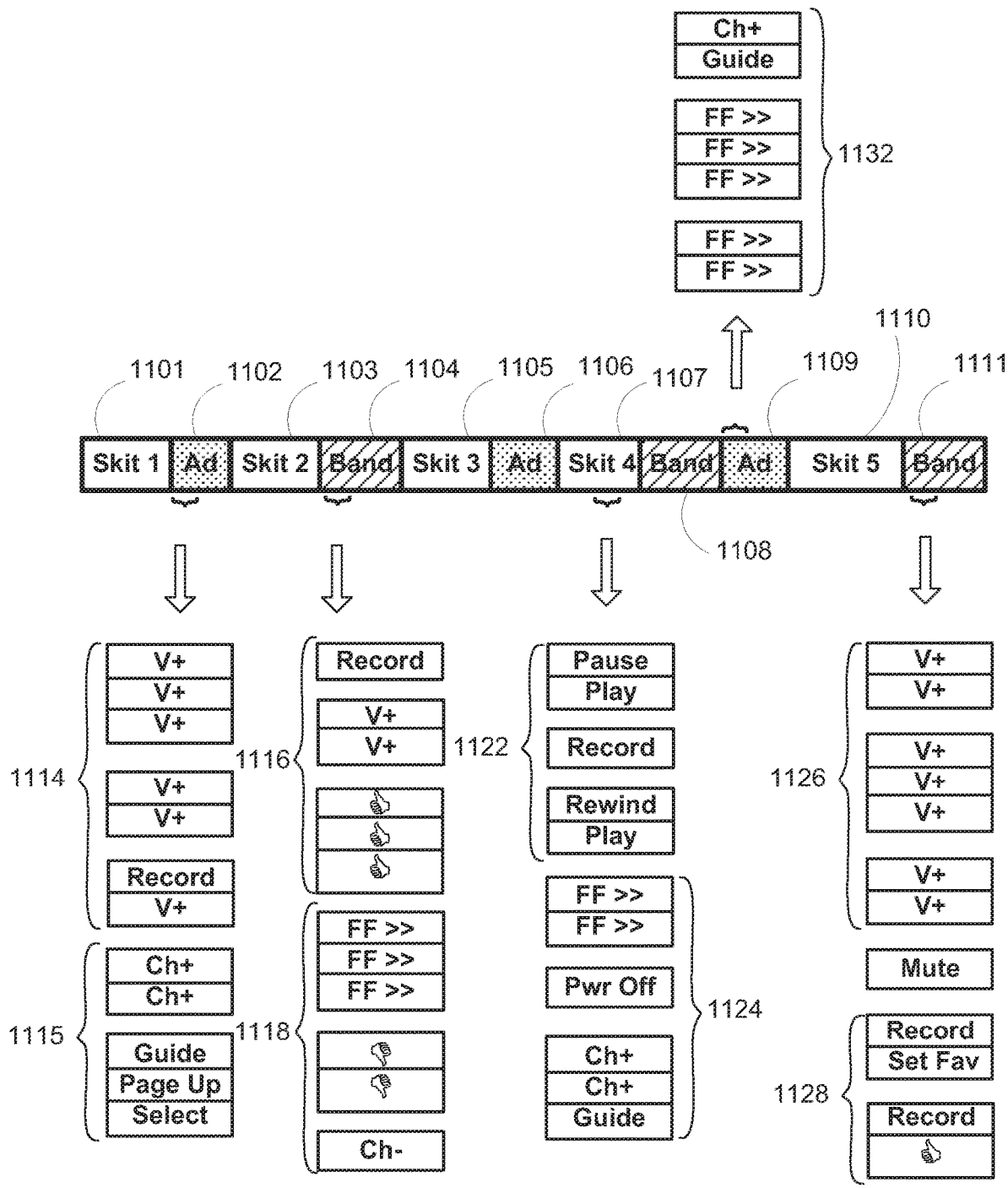
FIG. 11 shows example clickstream logs from users in relation to a video item.

FIG. 11 shows example clickstream logs from users in relation to a video item. The media item may include a plurality of different types of content. In this illustration, FIG. 11 shows the clickstreams of people consuming a show like "Saturday Night Live." The show may include segments such as "skit 1" 1101, ad 1102, "skit 2" 1003, band performance 1104, "skit 3" 1105, ad 1106, "skit 4" 1107, band performance 1108, ad 1109, "skit 5" 1110, and band performance 1111. The breakdown of the show into segments may be stored as metadata. Various exemplary user behavior and clickstreams received during the consumption of the media item are shown in FIG. 11.

Based on aggregate user behavior, the application 424 may cluster and/or classify users based on using methods or combinations of methods described in relation to FIGS. 5-7. Methods and systems described in FIGS. 5 and 6 may be used to detect user interest and certain behavior patterns based on individual behavior. Methods and systems described in FIG. 7 may be used to derive group behavior, behavior patterns, and/or media item information based on the group behavior. The clustering process may include categorizing users with similar patterns of input device behavior into separate groups. Clustering may be based on raw clickstream data (e.g., individual time-stamped indicators), or data derived from the raw clickstream data (e.g., detected patterns from raw clickstream data).

According to one aspect, the application 424 detects a similarity between actions and/or users by at least defining distance functions. A distance function may be defined in a way to determine how similar or dissimilar two clickstreams may be. In some aspects, the application 424 compares a clickstream received with a defined and/or known clickstream pattern. In practice, two clickstreams may not be exactly the same. Therefore, the application 424 may use a distance function to find similarity between two slightly different clickstreams. A suitable distance function may be defined in terms of one or more time-stamped indicators, respective components of one or more indicator (e.g., timestamp, event, etc.), and/or data representative of the time-stamped indicators (e.g., time between clicks, number of clicks, etc.). Suitable distance functions configured to compare two clickstreams may incorporate Euclidean distance, Manhattan distance, Mahalanobis distance, angle between two vectors, Hamming distance, and the like.

The application 424 may use a distance function in any suitable clustering algorithm, such as, without limitation, hierarchical, partitional, density-based, or subspace clustering methods. Any combination of suitable methods may be used as well. Clustering algorithms may be useful because they can be configured to identify patterns across a population of users. For instance, groups of users may help identify what type of users are generally interested in the particular portion of the media item. Clustering may also be helpful to identify what type of content is in the portion of the media item being consumed.

In FIG. 11, during the beginning portion of ad 1102, the application 424 records input device behavior from at least five different users. Three of the five users (denoted in group 1114) may be grouped together based on their similar behavior because, for example, they all exhibited behavior patterns associated with excitement. As discussed previously in relation to the clickstream behavior of FIG. 8, multiple volume button presses may indicate that someone has noticed something interesting and wanted to turn up the volume to hear it. A user request to record using the record button may also indicate that someone is so interested they would like to record and rewatch it later. At the individual level, the application 424 may detect behavior patterns using methods and systems described in relation to FIGS. 5 and 6. In one configuration, the application 424 may create metadata based on detected collective behavior for that portion of the media item. For example, the application 424 may record the existence of an exciting moment in a media item (e.g., a funny commercial with talking kittens) based on the detected behavior of a plurality of users.

The other two of the five users (denoted in group 1115) may be grouped together because they both exhibited behavior patterns associated with disinterest in the media item. Changing channels (i.e., pressing Channel Up twice, or navigating to the guide to select other channels) may indicate that the user is no longer interested in the content. Individually, or in aggregate, the input device behavior in group 1115 may indicate that some type of user is not interested in the content at that portion of the media item (e.g., determining that the two users are both sports fanatics and both dislike that portion of the media item). In certain aspects, the group behavior in group 1115 may indicate a high probability that undesirable content (e.g., advertisement, uninteresting content, etc.) is playing at the time. Similar information may also be derived or inferred by the application 424 from group behavior during ad 1109 in group 1132.

During band performance 1104, at least six clickstreams have been recorded. Group 1116 may indicate user behavior exhibiting interest in the content. If metadata about that portion of the media item is available, such as an identifier that U2 is the band performing during that portion of the media item, then the application 424 may add metadata to the profiles of the users of group 1116 to indicate that those users have an interest in music or the band U2. During band performance 1111, group 1124 may indicate user behavior exhibiting interest or excitement in the band playing during that segment. Clickstream behavior of users in group 1128, however, may indicate behavior patterns exhibiting disinterest in that segment of the media content. In a similar fashion, the application 424 may add metadata to those user profiles indicating a disinterest in the band playing during band performance 1111.

During a portion of "skit 4" 1107, at least six clickstreams have been recorded. Group 1122 may indicate that a group of users have found a moment or an event of the media item to be important. One user paused and played the content. Another user pressed record. Yet another user pressed rewind and play. Using methods and systems described in FIG. 6, the application 424 may infer user behavior indicating a salient moment or event in a media item (e.g., a very funny moment during "skit 4", or a very embarrassing moment, or a special appearance by a celebrity, and the like). Furthermore, the application 424 may add derived information about the media content, such as the location of the salient event in the media content or what kind of users enjoy the content, as metadata. On the other hand, users in group 1124 may indicate that some users are not interested in that portion of the media content, perhaps finding it offensive. The application 424 may record this negative reaction and add this as metadata to the media item. If details about the salient event are known, metadata may be added to the users exhibiting a reaction such that a disinterest in that particular event is associated with the users of group 1124.

Figure 12:
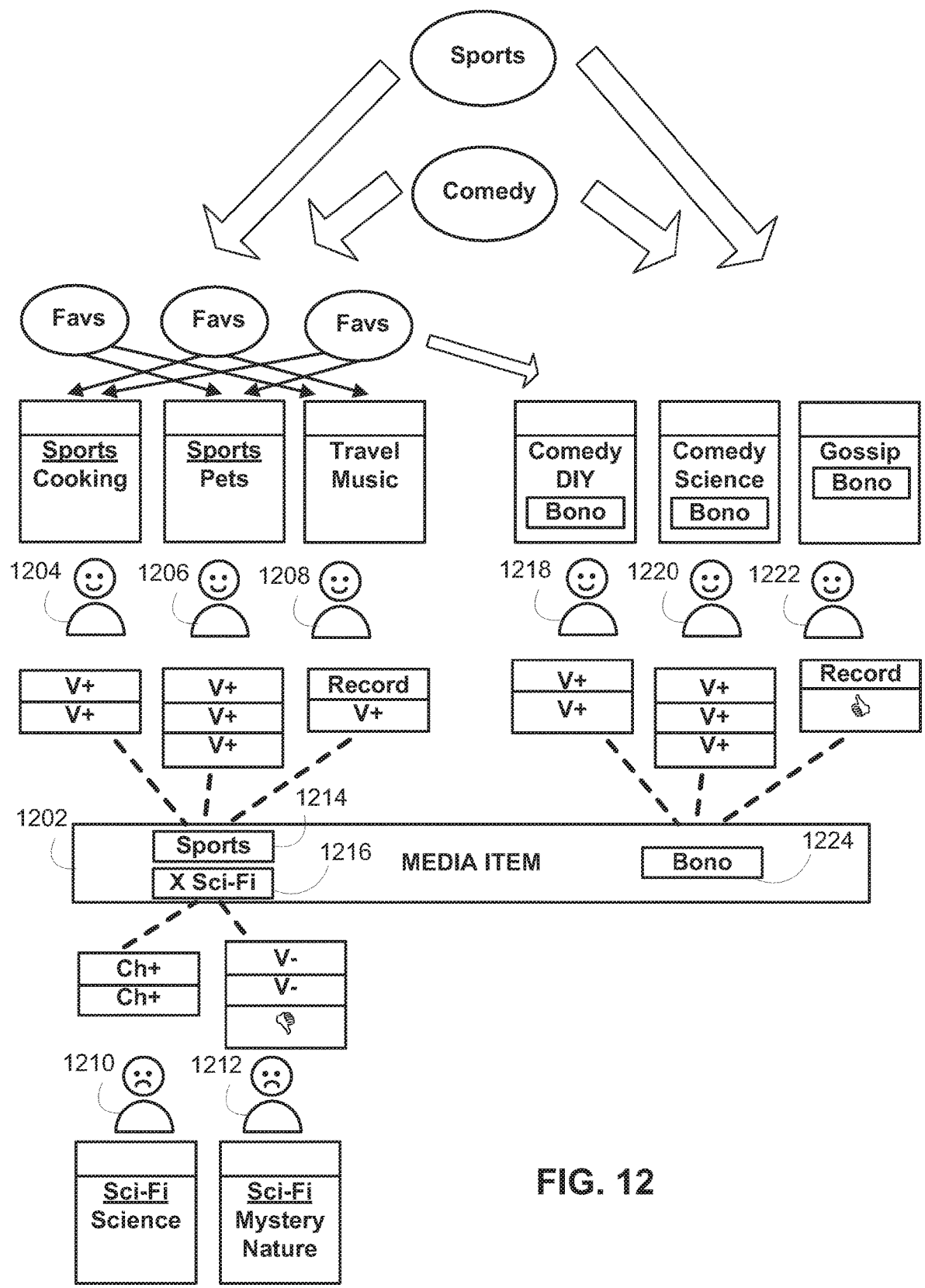
FIG. 12 shows another example clickstream logs from users in relation to a media item.

FIG. 12 shows example clickstream logs from users in relation to a media item. Using methods and systems described in FIG. 5, the application 424 may group users based on clickstream behavior detected during the consumption of media item 1202. Using methods and systems described in FIG. 7, users may be grouped using any suitable clustering method.

In one configuration, user input device behavior collected from users 1204, 1206 and 1208 by the application 424 may indicate a collective interest in a portion of a media item. Using detection methods described in FIG. 6, a level of interest may be derived by the application 424 based on the clickstream behavior. If available, information about the portion of interest in media item 1202 may be derived collaboratively by the application 424 based on the user profile information for users 1204, 1206 and 1208. For example, users 1204 and 1206 may be sports fans. The shared characteristic of the two users may indicate that sports fans in general are users who may be interested in that portion of media item 1202. This indication may be added as metadata tag 1214. In certain configurations, other content known to be related to sports may be recommended to users 1204, 1206 and 1208. Due to the shared interest of users 1204, 1206 and 1208 in that portion of the media content, the application 424 may infer that users 1204, 1206 and 1208 share similar interests as well. Personal favorites of users 1204, 1206 and 1208 may be recommended to each other. For instance, the application 424 may recommend a portion of the favorites of user 1208 to user 1204.

Similarly, during a different portion of media item 1224, the clickstream behaviors of users 1218, 1220 and 1222 may indicate that a group of users are interested in that portion of media item 1202. The shared interest of users 1218, 1220 and 1222 in the celebrity Bono may indicate that users who like Bono may generally find that portion of media item 1202 interesting. The application 424 may add this indication to media item 1202 as metadata 1224. In certain embodiments, because users 1204, 1206, 1208, 1218, 1220, and 1222 all share interest in media item 1202, the application 424 may infer that each user is likely to appreciate the favorite content that each of the other users enjoys. For instance, the favorite content of user 1206 may be recommended to user 1218, 1220, and/or 1222. In another instance, the application 424 may recommend general content related to sports to user 1218, 1220, and/or 1222. Because users 1218, 1220 and 1222 share the same interest in comedy, other content related to comedy may be recommended by the application 424 to user 1204, 1206 and/or 1208.

Besides deriving information about positive reactions to media item 1202, negative reactions may also be useful in deriving information about media item 1202. During the same portion of media item 1202, the application 424 may use the clickstream behavior of users 1210 and 1212 to identify a disinterest in that portion of media item 1202. Collaboratively, the shared interest in Sci-Fi of users 1210 and 1212 may indicate that Sci-Fi lovers in general do not like that portion of media content 1202. The negative information about the group of users 1210 and 1212 may be added as metadata using tag 1216 to indicate that the portion of the content should not be targeted to Sci-Fi lovers.

The above described embodiments of the present invention are presented for purposes of illustration and not of limitation, and the present invention is limited only by the claims which follow.

What is claimed is:

1. A method for providing media asset recommendations, the method comprising:
   receiving data that identifies: (a) quantity of user interactions with a first media asset for a group of users, and (b) elapsed time between the user interactions with the first media asset for the group of users;
   determining an inactivity threshold for the first media asset based on a) the quantity of the user interactions with the first media asset for the group of users, and (b) the elapsed time between the user interactions with the first media asset for the group of users;

receiving a plurality of time-stamped indicators from a media device, wherein each of the plurality of time-stamped indicators is associated with a corresponding action performed by a user with the media device with respect to the first media asset that is being generated for display;

identifying, based on the plurality of time-stamped indicators and the corresponding user action, periods of user activity and inactivity with respect to the first media asset by comparing frequency of plurality of time-stamped indicators to the inactivity threshold;

determining based on the identified periods of user activity and inactivity whether the user prefers the first media asset, wherein determining whether the user prefers the first media asset further comprises:

determining a behavior pattern of the user based on the plurality of time-stamped indicators received from the media device, wherein determining the behavior pattern of the user further comprises:

calculating a number of time-stamped indicators received over a period of time;

calculating a speed of the user action corresponding to each of the time-stamped indicators received over the period of time;

determining a type of the user action corresponding to each of the time-stamped indicators received over the period of time; and determining the behavior pattern based at least in part on the number of time-stamped indicators, the speed of the user action corresponding to each of the time-stamped indicators, and the type of the user action corresponding to each of the time-stamped indicators; and determining that the behavior pattern indicates a user preference for the characteristic of the first media asset;

in response to determining that the user prefers the first media asset:

retrieving a characteristic of the first media asset;

determining that the characteristic of the first media asset matches a first characteristic associated with a user group among the group of users that is associated with a plurality of predetermined media preferences;

in response to determining that the characteristic of the first media asset matches the first characteristic associated with the user group, adding the user into the user group;

retrieving a second characteristic associated with the user group;

retrieving a second media asset having the second characteristic; and generating for display, to the user, a media asset recommendation of the second media asset.

2. The method according to claim 1, wherein determining that the behavior pattern indicates a user preference for the characteristic of the first media asset further comprises:

determining, based on metadata associated with the first media asset, a plurality of segments of the first media asset;

determining, based on the time-stamped indicators, that the user action corresponds to a first segment of the plurality of segments; and determining, based on the behavior pattern, that the user has a preference for a characteristic of the first segment of the plurality of segments.

3. The method according to claim 1, wherein the user action performed with the media device with respect to the first media asset comprises a command to modify playback of the first media asset.

4. The method according to claim 1, wherein determining that the characteristic of the first media asset matches the first characteristic associated with the user group further comprises:

retrieving the first characteristic associated with the user group; and comparing the characteristic of the first media asset with the first characteristic associated with the user group.

5. The method according to claim 4, wherein retrieving the first characteristic associated with the user group further comprises retrieving a characteristic shared by each of a plurality of users in the user group.

6. The method according to claim 1, further comprising:

receiving a second plurality of time-stamped indicators from media devices associated with each of a plurality of users in the user group, wherein each of the second plurality of time-stamped indicators is associated with a corresponding action performed by the user with the media devices with respect to a third media asset;

determining, based on the user action, that the plurality of users in the user group prefer the third media asset; and assigning a characteristic associated with each of the plurality of users in the user group to the third media asset.

7. The method according to claim 6, wherein determining that the plurality of users in the user group prefer the third media asset further comprises:

determining, based on metadata associated with the third media asset, a plurality of segments of the third media asset;

determining, based on the plurality of time-stamped indicators, that the user action corresponds to a first segment of the plurality of segments of the third media asset; and determining that the user action indicates that the plurality of users in the user group prefer a characteristic of the first segment of the plurality of segments of the third media asset.

8. The method according to claim 1 further comprising adjusting the inactivity threshold for the first media asset based on a time of day.

9. A system for providing media asset recommendations, the system comprising:

control circuitry configured to:

receive data that identifies: (a) quantity of user interactions with a first media asset for a group of users, and (b) elapsed time between the user interactions with the first media asset for the group of users;

determine an inactivity threshold for the first media asset based on a) the quantity of the user interactions with the first media asset for the group of users, and (b) the elapsed time between the user interactions with the first media asset for the group of users;

receive a plurality of time-stamped indicators from a media device, wherein each of the plurality of time-stamped indicators is associated with a corresponding action performed by a user with the media device with respect to the first media asset that is being generated for display;

identify, based on the plurality of time-stamped indicators and the corresponding user action, periods of user activity and inactivity with respect to the first media asset by comparing frequency of plurality of time-stamped indicators to the inactivity threshold;

determine based on the identified periods of user activity and inactivity whether the user prefers the first media asset, wherein, when determining whether the user prefers the first media asset, the control circuitry is further configured to:

determine a behavior pattern of the user based on the plurality of time-stamped indicators received from the media device, wherein, when determining the behavior pattern of the user, the control circuitry is further configured to:

calculate a number of time-stamped indicators received over a period of time;

calculate a speed of the user action corresponding to each of the time-stamped indicators received over the period of time;

determine a type of the user action corresponding to each of the time-stamped indicators received over the period of time; and determine the behavior pattern based at least in part on the number of time-stamped indicators, the speed of the user action corresponding to each of the time-stamped indicators, and the type of the user action corresponding to each of the time-stamped indicators; and determine that the behavior pattern indicates a user preference for the characteristic of the first media asset;

in response to determining that the user prefers the first media asset:

retrieve a characteristic of the first media asset;

determine that the characteristic of the first media asset matches a first characteristic associated with a user group among the group of users that is associated with a plurality of predetermined media preferences;

in response to determining that the characteristic of the first media asset matches the first characteristic associated with the user group, add the user into the user group;

retrieve a second characteristic associated with the user group;

retrieve a second media asset having the second characteristic; and generate for display, to the user, a media asset recommendation of the second media asset.

10. The system according to claim 9, wherein, when determining that the behavior pattern indicates a user preference for the characteristic of the first media asset, the control circuitry is further configured to:

determine, based on metadata associated with the first media asset, a plurality of segments of the first media asset;

determine, based on the time-stamped indicators, that the user action corresponds to a first segment of the plurality of segments; and determine, based on the behavior pattern, that the user has a preference for a characteristic of the first segment of the plurality of segments.

11. The system according to claim 9, wherein the user action performed with the media device with respect to the first media asset comprises a command to modify playback of the first media asset.

12. The system according to claim 9, wherein, when determining that the characteristic of the first media asset matches the first characteristic associated with the user group, the control circuitry is further configured to:

retrieve the first characteristic associated with the user group; and compare the characteristic of the first media asset with the first characteristic associated with the user group.

13. The system according to claim 12, wherein, when retrieving the first characteristic associated with the user group, the control circuitry is further configured to retrieve a characteristic shared by each of a plurality of users in the user group.

14. The system according to claim 9, wherein the control circuitry is further configured to:

receive a second plurality of time-stamped indicators from media devices associated with each of a plurality of users in the user group, wherein each of the second plurality of time-stamped indicators is associated with a corresponding action performed by the user with the media devices with respect to a third media asset;

determine, based on the user action, that the plurality of users in the user group prefer the third media asset; and assign a characteristic associated with each of the plurality of users in the user group to the third media asset.

15. The system according to claim 14, wherein, when determining that the plurality of users in the user group prefer the third media asset, the control circuitry is further configured to:

determine, based on metadata associated with the third media asset, a plurality of segments of the third media asset;

determine, based on the plurality of time-stamped indicators, that the user action corresponds to a first segment of the plurality of segments of the third media asset; and determine that the user action indicates that the plurality of users in the user group prefer a characteristic of the first segment of the plurality of segments of the third media asset.

16. The system according to claim 9 wherein the control circuitry is further configured to adjust the inactivity threshold for the first media asset based on a time of day.

* * * * *